(No Model.)
T. R. CRANE.
FERTILIZER FEED FOR DRILLS.
No. 363,603. Patented May 24, 1887.
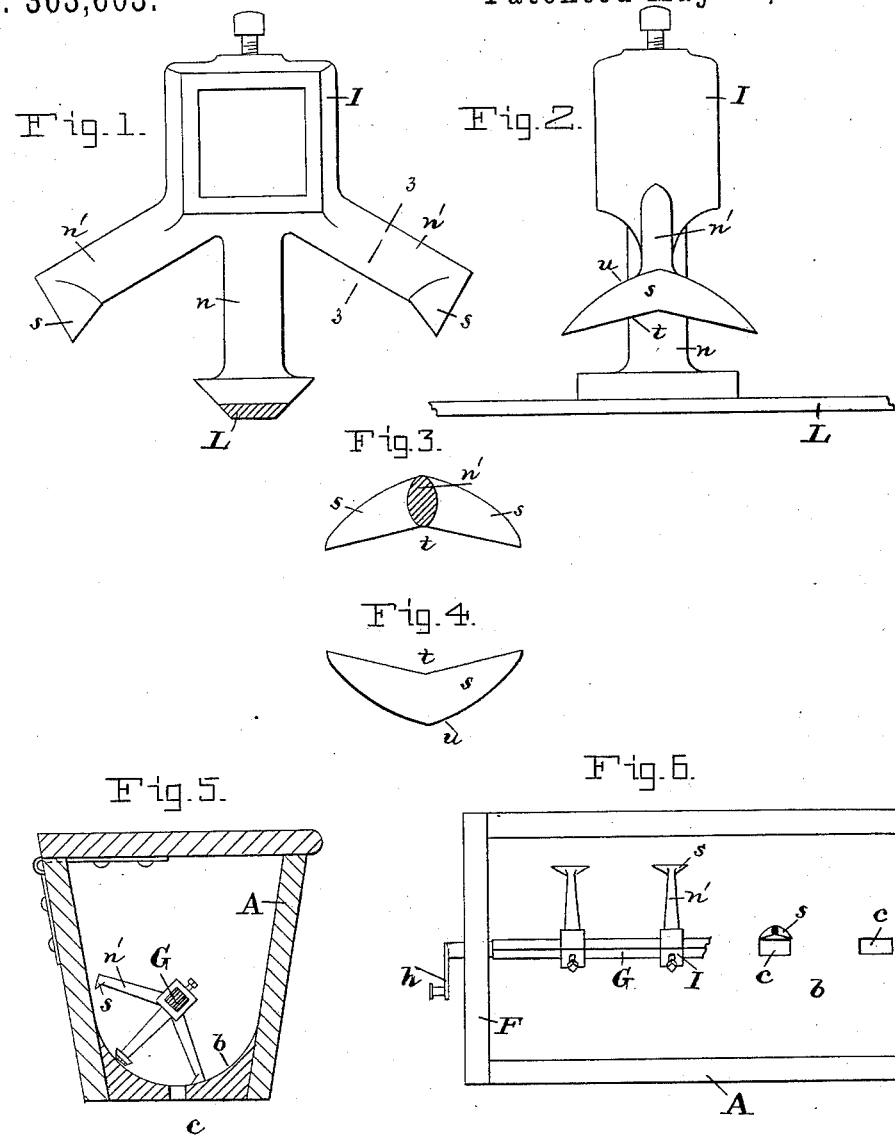
WITNESSES:
John E. Morris.
A. E. Eader
INVENTOR:
Thos. R. Crane
BY Chas B. Mann
ATTORNEY.

UNITED STATES PATENT OFFICE.

THOMAS R. CRANE, OF HEATHSVILLE, VIRGINIA.

FERTILIZER-FEED FOR DRILLS.

SPECIFICATION forming part of Letters Patent No. 363,603, dated May 24, 1887.

Application filed February 18, 1887. Serial No. 228,037. (No model.)

*To all whom it may concern:*

Be it known that I, THOMAS R. CRANE, a citizen of the United States, residing at Heathsville, in the county of Northumberland and State of Virginia, have invented certain new and useful Improvements in Fertilizer-Feeds for Drills, of which the following is a specification.

My invention relates to an improved agitator for fertilizer drills, and has for its object to provide an agitator device with an improved prong and foot to sweep the fertilizer into the discharge-openings.

Referring to the accompanying drawings, Figures 1 and 2 show broad and narrow side views, respectively, of the feed-agitator. Fig. 3 is a top view of the improved foot on line 3 3. Fig. 4 is a bottom plan of the foot. Fig. 5 is a cross-section of the box, showing the agitator in position. Fig. 6 is a top plan of the box-agitators, discharge-openings, and showing one foot in position at a discharge-opening.

The fertilizer-box, as usual, has sloping sides A and a bottom, b, of any desired kind, provided with discharge-openings c, arranged in a line extending lengthwise of the box. Any well-known device may be employed to regulate or entirely stop the discharge of the fertilizer. A rock-shaft, G, extends through the box and has bearings in the end F. On the outside this shaft has a crank-arm, h, by which the shaft is made to rock. Each agitator comprises a head, I, fitted on the rock-shaft, and made fast thereto above the openings c. An arm, n, and two side prongs, n', project from the head. The center arms of all the agitators are connected by a flat face-bar, L. Each side prong n' has a foot, s, of peculiar shape, which is productive of a useful result. This foot comprises two oblique prongs, which together produce a shape approximating that of a crescent. The inner or sweep face of the two prongs forms an obtuse angle or concave face, t. (See Figs. 2, 3, and 4.)

In operation the rock-shaft G causes the prongs of the agitator and the bar L to vibrate and stir the fertilizer and prepare it for passing out of the openings c. When by the action of the prongs and bar the fertilizer is in proper comminuted condition, the obtuse angle face t of the foot s serves to sweep the fertilizer to the discharge-opening c, taking the position with respect to said opening, shown in Fig. 6, while the shape of the back face of the foot, which is that of an outer angle or convex face, u, permits it to move away from the opening c without pushing the fertilizer back, and aids the fertilizer to fall over on the sweep-face side of the foot.

Having described my invention, I claim—

In combination with a fertilizer-box having discharge-openings c in its bottom and rock-shaft G, the agitator attached to the rock-shaft, and two side prongs, each of which is provided with the herein-described foot s, comprising two oblique prongs which together produce a concave sweep face, t, and a convex back face, u, as and for the purpose set forth.

In testimony whereof I affix my signature in the presence of two witnesses.

THOMAS R. CRANE.

Witnesses:
  JOHN E. MORRIS,
  JNO. T. MADDOX.